United States Patent
Figueira et al.

(10) Patent No.: US 11,964,600 B2
(45) Date of Patent: Apr. 23, 2024

(54) VEHICLE WITH A REMOVABLE ARMREST AND METHOD

(71) Applicant: Ford Global Technologies, LLC, Dearborn, MI (US)

(72) Inventors: Juan Filipe Brito Figueira, Salvador (BR); Guilherme Novaes Gomes Lima, Salvador (BR); Leandro Quinelato, Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 17/665,777

(22) Filed: Feb. 7, 2022

(65) Prior Publication Data

US 2023/0249597 A1  Aug. 10, 2023

(51) Int. Cl.
*B60N 2/75* (2018.01)
*B60R 11/00* (2006.01)
*E05D 3/02* (2006.01)

(52) U.S. Cl.
CPC ............... *B60N 2/79* (2018.02); *E05D 3/02* (2013.01); *B60R 2011/0007* (2013.01); *E05Y 2900/538* (2013.01)

(58) Field of Classification Search
CPC ........... B60N 2/79; B60N 2/797; B60N 2/767
See application file for complete search history.

(56) References Cited

U.S. PATENT DOCUMENTS

| 5,067,201 | A  | * | 11/1991 | Marchione | E05D 11/1085 16/270 |
| 6,739,640 | B2 | * | 5/2004 | Schmidt | B60K 35/10 296/37.13 |
| 6,789,831 | B2 |   | 9/2004 | Schmidt et al. | |
| 7,100,242 | B2 | * | 9/2006 | Maierholzner | B60N 2/943 297/411.32 |
| 7,513,549 | B2 | * | 4/2009 | Tomasson | B60R 13/0262 296/70 |
| 8,167,348 | B2 |   | 5/2012 | Fesenmyer | |
| 8,979,160 | B1 |   | 3/2015 | Pericak et al. | |
| 2006/0108816 | A1 |   | 5/2006 | Radu et al. | |
| 2007/0205642 | A1 |   | 9/2007 | Bejin et al. | |
| 2010/0156129 | A1 |   | 6/2010 | Evans et al. | |
| 2012/0104822 | A1 |   | 5/2012 | Henke et al. | |
| 2017/0001521 | A1 | * | 1/2017 | Joo | B60K 35/00 |
| 2018/0222371 | A1 | * | 8/2018 | Nothroff | B60N 2/767 |
| 2018/0371808 | A1 | * | 12/2018 | Yano | E05B 83/32 |

(Continued)

FOREIGN PATENT DOCUMENTS

DE  102013014155 A1 * 4/2014 ............ B60R 7/04

*Primary Examiner* — Gregory A Blankenship
(74) *Attorney, Agent, or Firm* — Vichit Chea Price Heneveld LLP

(57) ABSTRACT

An armrest assembly for a vehicle and method of operating includes a body with a hinge receiver coupled to the top section. An armrest member is rotationally and removably coupled to the body and is movable between first, second, and third positions A latch receiver having a locking mechanism that operably couples to a latch is defined on the top section or the armrest member. A hinge feature operably couplable to the hinge receiver is defined on the armrest member. An input device is communicatively coupled to a controller, wherein the controller is configured to actuate the locking mechanism.

20 Claims, 10 Drawing Sheets

(56) References Cited

U.S. PATENT DOCUMENTS

| | | |
|---|---|---|
| 2021/0053473 A1 | 2/2021 | Chen et al. |
| 2021/0291987 A1* | 9/2021 | Glain ................. B64D 11/0644 |
| 2022/0194279 A1* | 6/2022 | Sera ....................... B60R 16/03 |
| 2023/0249597 A1* | 8/2023 | Figueira ................. B60N 2/753 |
| | | 296/24.34 |

* cited by examiner

VEHICLE WITH A REMOVABLE ARMREST AND METHOD

FIELD OF THE DISCLOSURE

The present disclosure generally relates to a vehicle armrest assembly, in particular, a vehicle armrest assembly that utilizes a removable armrest member.

BACKGROUND OF THE DISCLOSURE

Armrest assemblies are commonly employed in motor vehicles. Some armrest assemblies may be movable between a first position and a second position. When in the first position, such armrest assemblies may be disposed over a body, such as a center console. When in the second position, such armrest assemblies may be pivoted generally upward such that access to contents housed beneath the armrest assembly on a body are accessible when the armrest is held in the second position. However, such access to the contents may be burdensome as it requires a user to keep the armrest assembly in an upright, second position, and such access to the contents may allow for unauthorized accessibility. It would be desirable to provide for an arrangement that allows for efficient movement and placement of the armrest assembly and that prevents unauthorized access to contents disposed below the armrest assembly.

SUMMARY OF THE DISCLOSURE

According to a first aspect of the present disclosure, a method of operating a vehicle armrest is provided. The method includes the positioning of an armrest member on a body, actuating an input device configured to communicate with a controller, unlocking a locking mechanism disposed within a latch receiver coupled to the body, and decoupling a latch coupled to the armrest member from the latch receiver. The method also includes rotating the armrest member about a hinge receiver defined on the body from a first position to a second position, translating the armrest member generally upward from the second position to a third position, wherein a hinge feature that is defined on the armrest member is decoupled from the hinge receiver in the third position, translating the armrest member generally downward from the third position to the second position, wherein the hinge feature is coupled to the hinge receiver in the second position, and rotating the armrest member about the hinge receiver from the second position to the first position. The method also includes coupling the latch to the latch receiver, and locking the locking mechanism disposed within the latch receiver.

Embodiments of the first aspect of the disclosure can include any one or a combination of the following features:
- actuating an at least one adjustable feature that is disposed on a control panel, the control panel being disposed on a top portion of the body;
- the input device is a vehicle human machine interface;
- inputting an authentication key into the human machine interface;
- the hinge receiver is coupled to a vehicle forward section of the body, and the hinge feature is defined on a vehicle forward portion of the armrest member;
- rotating the armrest about a second hinge receiver from the first position to the second position;
- the latch is coupled to a bottom portion of the armrest member; and
- the at least one adjustable feature is configured to direct an at least one steering function of the vehicle.

According to a second aspect of the present disclosure, a method of operating a vehicle armrest is provided. The method includes the positioning of an armrest member on a top section of a body, actuating an input device configured to communicate with a controller, wherein the controller is configured to communicate with a locking mechanism, inputting an authorization key into the input device, unlocking the locking mechanism disposed within a latch receiver coupled to the body, and decoupling a latch coupled to the armrest member from the latch receiver. The method also includes rotating the armrest member about a first hinge receiver and a second hinge receiver defined on the body from a first position to a second position, translating the armrest member generally upward from the second position to a third position, wherein a first hinge feature and a second hinge feature are decoupled from the first hinge receiver and the second hinge receiver in the third position, and translating the armrest member generally downward from the third position to the second position, wherein the first hinge feature is coupled to the first hinge receiver and the second hinge feature is coupled to the second hinge receiver in the second position. The method also includes rotating the armrest member about the first hinge receiver and the second hinge receiver from the second position to the first position, coupling the latch to the latch receiver, and locking the locking mechanism disposed within the latch receiver.

Embodiments of the second aspect of the disclosure can include any one or a combination of the following features:
- actuating at least one adjustable feature disposed on a control panel, the control panel being disposed on a top portion of the body;
- the first hinge receiver and the second hinge receiver are defined on a top section of the body, and the first hinge receiver and the second hinge receiver are defined on a vehicle forward section of the body, and the first hinge receiver is generally coaxial with the second hinge receiver;
- disengaging a latch engagement member defined on an end of the latch with the locking mechanism; and
- engaging the latch engagement member with the locking mechanism.

According to a third aspect of the present disclosure, an armrest assembly that includes a body having a top section is provided. A hinge receiver is coupled to the top section. An armrest member is rotationally and removably coupled to the body. The armrest member is movable between a first position and a second position. The armrest member is also translatable between the second position and a third position. A latch receiver is defined on the top section or a bottom portion of the armrest member, the latch receiver further comprising a locking mechanism disposed within the latch receiver. A latch is defined on the other of the top section or the bottom portion. The latch is housed within the latch receiver when the armrest member is in the first position. A hinge feature is defined on the bottom portion of the armrest member. The hinge feature is coupled to the hinge receiver when the armrest member is in the first position and the second position, and is decoupled from the hinge receiver when the armrest member is in the third position. An input device is in communication with a controller that is configured to actuate the locking mechanism. A control panel is also coupled to the top section of the body. The control panel further comprises at least one adjustable feature disposed on the control panel. The adjustable feature is in communication with the controller.

Embodiments of the third aspect of the disclosure can include any one or a combination of the following features:

- the hinge receiver further comprising a receiver base and a receiver head vehicle upward of the receiver base, wherein the hinge feature further comprises a slot feature, the slot feature being configured to allow the receiver head to translate into an aperture defined within the hinge feature as the armrest member translates from the third position to the second position;
- the slot feature is adjacent to the receiver head when the armrest member is in the first position, and the slot feature is vehicle downward of the receiver head when the armrest member is in the second position;
- the hinge receiver is coupled to a vehicle forward section of the body, and the hinge feature is defined on a vehicle forward portion of the armrest member;
- the adjustable feature is configured to actuate at least one vehicle function;
- the adjustable feature is configured to actuate a steering function of the vehicle; and
- the latch further comprises a latch engagement member at an end of the latch, the latch engagement member being configured to operably couple to the locking mechanism.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
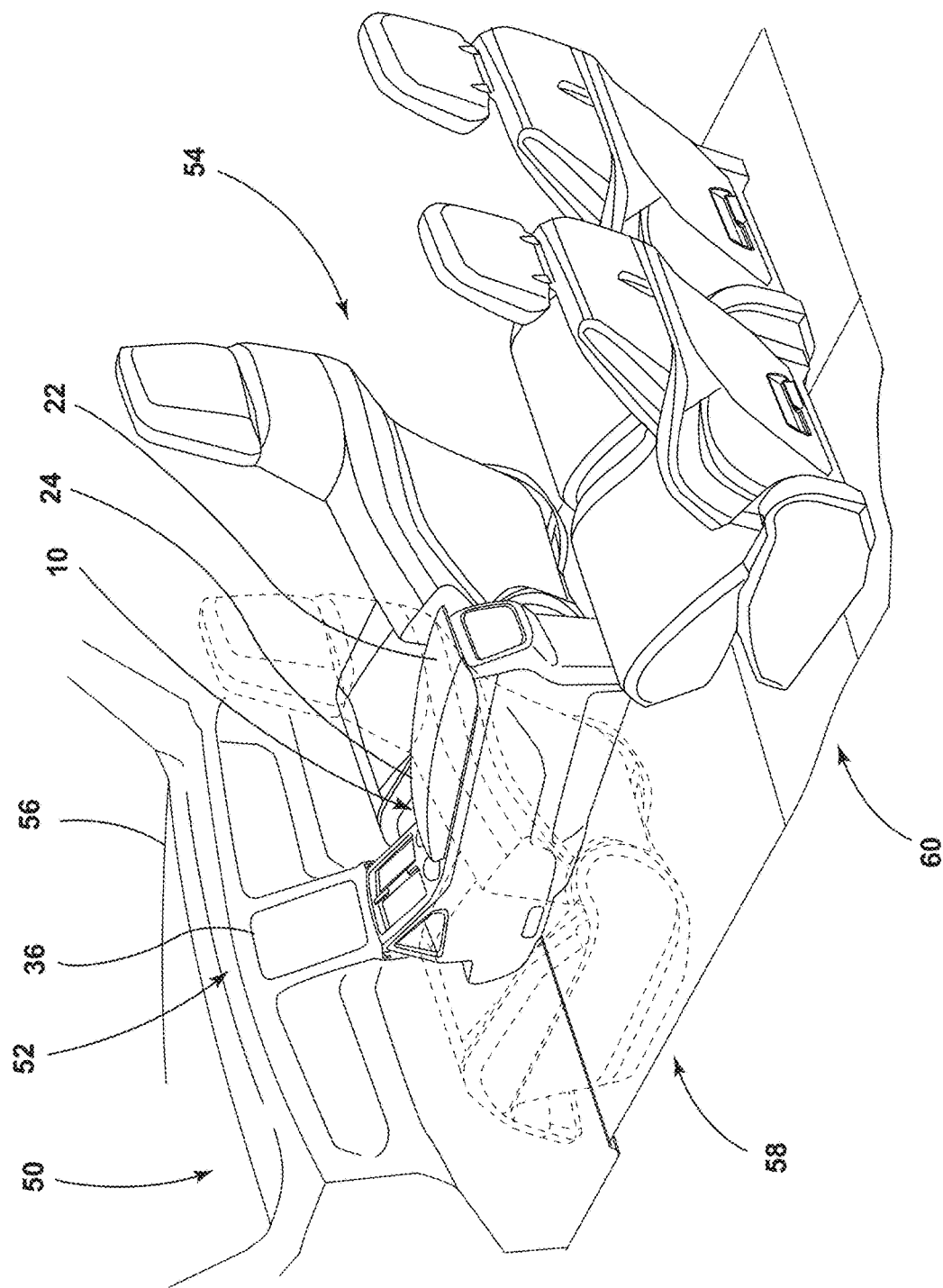
FIG. 1 is a top view of a passenger compartment of a vehicle having an armrest assembly with an armrest member in a first position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle armrest assembly and a method of operating a vehicle armrest. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
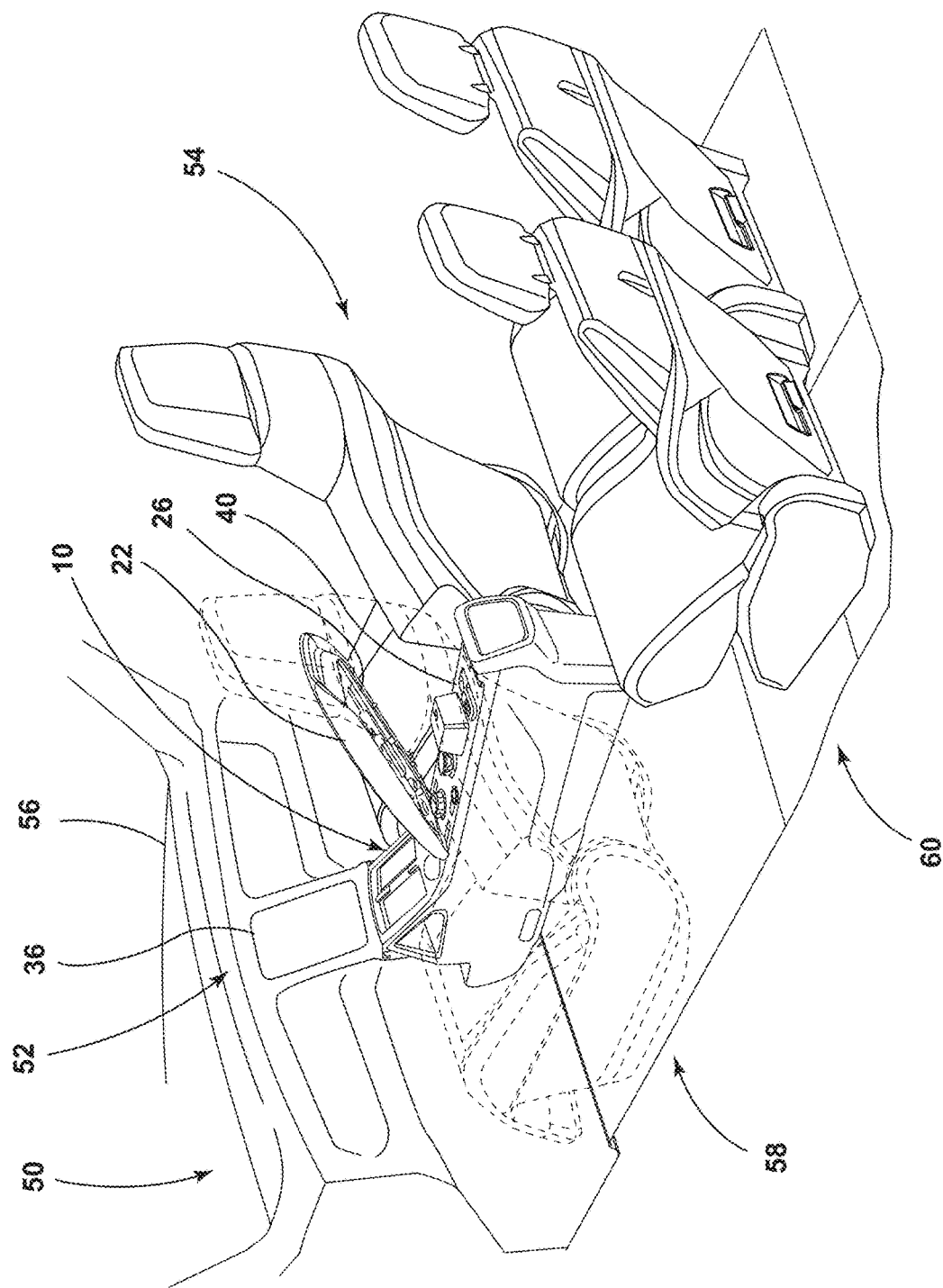
FIG. 2 is a top view of the passenger compartment of the vehicle having the armrest assembly with the armrest member in a second position, according to one example.
Figure 3:
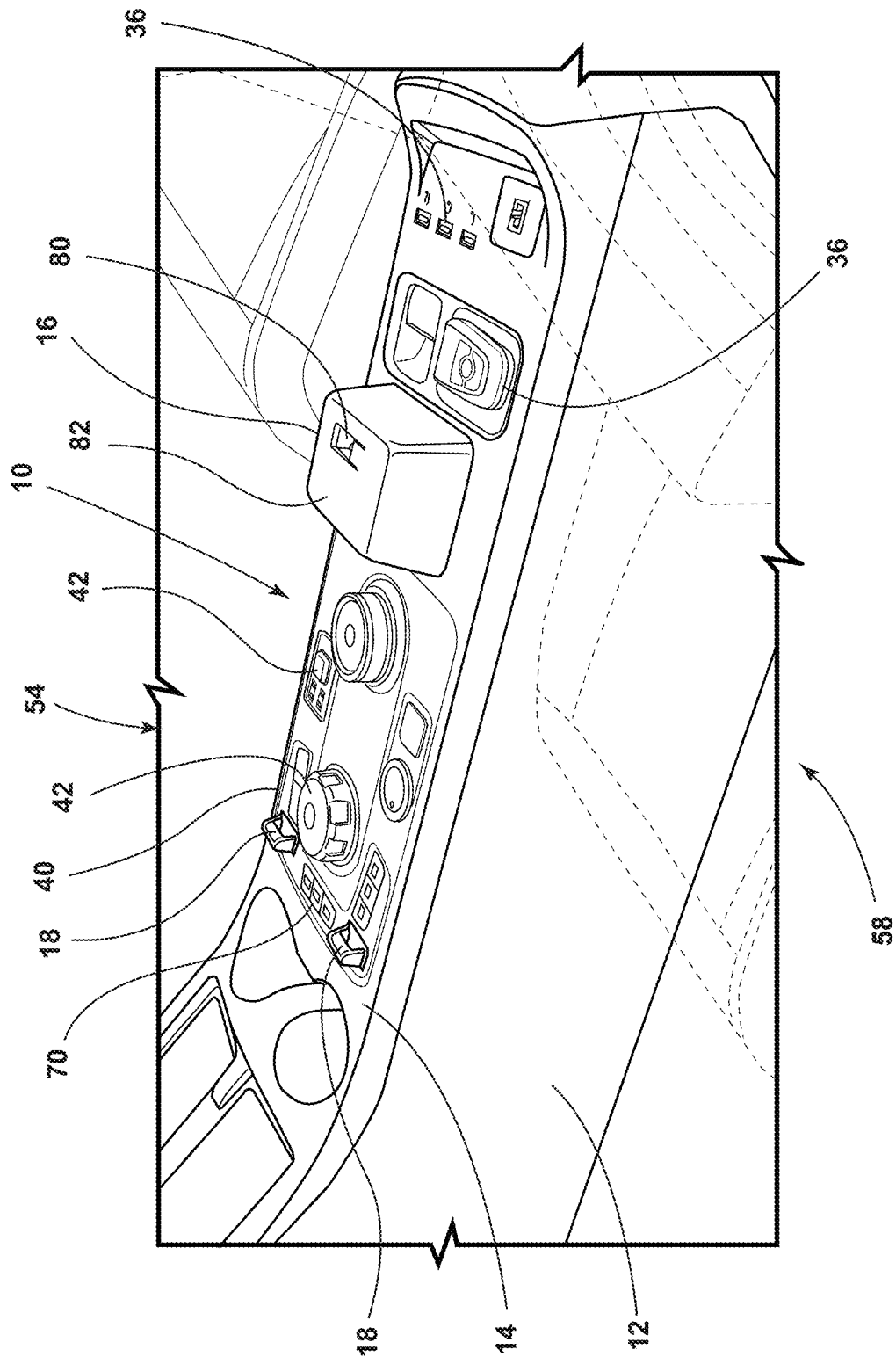
FIG. 3 is a top view of the passenger compartment of the vehicle having the armrest assembly with the armrest member in a third position, according to one example.

Referring to FIGS. 1-9, depicted is a vehicle armrest assembly 10. The vehicle armrest assembly system 10 includes a body 12 having a top section 14. A latch receiver 16 is defined on the top section 14 and a hinge receiver 18 is coupled to the top section 14, the latch receiver 16 further comprising a locking mechanism 20 disposed within the latch receiver 16. An armrest member 22 is rotationally and removably coupled to the body 12. The armrest member 22 is movable between a first position 24, shown in FIG. 1, and a second position 26, shown in FIG. 2. The armrest member is also translatable between the second position 26 and a third position 28, as shown in FIG. 3. A latch 30 is defined on a vehicle forward, bottom portion 32 of the armrest member 22. The latch 30 is housed within the latch receiver 16 when the armrest member 22 is in the first position 24. A hinge feature 34 is defined on the bottom portion 32 of the armrest member 22. The hinge feature 34 is coupled to the hinge receiver 18 when the armrest member 22 is in the first position 24 and the second position 26, and is decoupled from the hinge receiver 18 when the armrest member 22 is in the third position 28. An input device 36 is in communication with a controller 38 that is configured to actuate the locking mechanism 20. A control panel 40 is also coupled to the top section 14 of the body 12. The control panel 40 further comprises at least one adjustable feature 42 disposed on the control panel 40. The adjustable feature 42 is in communication with the controller 38.

Referring to FIGS. 1 and 2, the vehicle 50 has a vehicle interior 52 that includes a passenger compartment 54 therein contained within a vehicle body 56. The passenger compartment 54 may include a first seating row 58 and a second seating row 60. Fewer or more seating rows may be included in the passenger compartment 54 without departing from the teachings herein. The first seating row 58 may include a driver seat and passenger seat. The driver and the passenger seat may be separated by an armrest assembly 10, as illustrated in FIGS. 1 and 2. The second seating row 60 may include rear passenger seats. The rear passenger seats of the second seating row 60 may include bucket seating or may be bench seating. Further, the rear seating may include the armrest assembly 10 housed within the second passenger seat. The armrest assembly 10, as illustrated in FIGS. 1 and 2, may be disposed in various locations throughout the vehicle 50. By way of example not limitation, the armrest assembly 10 may be disposed between the driver and passenger seat, between a first rear seat and second rear seat, or any practicable location within the passenger compartment 54 of the vehicle interior 52 without departing from the teachings herein.

In various examples, the passenger compartment 54 is a passenger compartment 54 that may be within the vehicle interior 52 of a sedan, a sport utility vehicle, a truck, a van, a crossover, and/or other styles of vehicle. The passenger compartment 54 may be within the vehicle interior 52 of a manually operated vehicle (e.g., with a human driver), a fully autonomous vehicle (e.g., no human driver), or a partially autonomous vehicle (e.g., may be operated with our without a human driver).

Referring to FIGS. 3-9, the armrest assembly 10 includes the body 12. In various configurations, the body 12 includes the top section 14. As illustrated in FIGS. 3-9, the body 12 may be positioned in various positions throughout the passenger compartment 54. In some embodiments, the body 12 may be a vehicle center console, a vehicle armrest, or any body 12 that may allow for coupling of various components of the armrest assembly 10 to the body 12. Additionally, or alternatively, the body 12 may be any practicable size, so long as the body 12 allows for coupling of various components of the armrest assembly 10 to the body 12.

Referring further to FIGS. 3-9, the body 12 is configured to generally support and/or couple to additional components of the armrest assembly 10. For example, in some embodiments the control panel 40 may be disposed on the top section 14 of the body 12 and the armrest member 22 may be coupled to the top section 14 of the body 12, as provided herein.

Referring again to FIGS. 3-9, the armrest assembly 10 includes a hinge receiver 18 coupled to the body 12. In some embodiments, the hinge receiver 18 may be coupled to the top section 14 of the body 12 and may extend vehicle upward from the top section 14 of the body 12. In other embodiments, the hinge receiver 18 may be coupled to a vehicle-forward section 70 of the body 12. In yet other embodiments, the hinge receiver 18 may be integrally formed out of the body 12. The hinge receiver 18 may further comprise a receiver base 72 and a receiver head 74 vehicle upward of the receiver base 72. The receiver base 72 may be coupled to the body 12 and is configured to support the receiver head 74. The receiver head 74 may generally define at least a portion of a semi-circular shape. In some embodiments, the receiver head 74 may generally define at least one flat portion and at least one generally semi-circular portion, as illustrated in FIGS. 7-9. It is generally contemplated that the receiver head 74 may comprise various shapes, such as a cylindrical shape or hexagonal shape, so long as the receiver head 74 may couple to hinge feature 34.

The receiver head 74 is configured to operably couple to the hinge feature 34 and permit a rotational movement of the armrest member 22 about a center axis 76 of the receiver head 74. Additionally, or alternatively, it is generally contemplated that the armrest assembly 10 may include multiple hinge receivers 18. By way of example, not limitation, a first hinge receiver 18 and a second hinge receiver 18 may be coupled to the top section 14 of the body 12 and may be coaxial. The armrest member 22 may then operably couple to the first hinge receiver 18 and the second hinge receiver 18 and is rotatable about a center axis 76 of the first hinge receiver 18 and the second hinge receiver 18.

Referring to FIGS. 3-6, the armrest assembly 10 includes a latch receiver 16 coupled to the body 12. In some embodiments, the latch receiver 16 may be coupled to the top section 14 of the body 12. In other configurations, the latch receiver 16 may be defined within the body 12. In various embodiments, the latch receiver 16 may be integrally formed out of the top section 14 of the body 12. For example, the body 12 and latch receiver 16 may be molded polyvinyl chloride (PVC) or acrylonitrile butadiene styrene (ABS), such that the body 12 and the latch receiver 16 are integrally coupled. In some embodiments, the latch receiver 16 further comprises a latch receiver aperture 80 defined on a top portion 82 of the latch receiver 16 and a locking mechanism 20 disposed within the latch receiver 16. The latch receiver aperture 80 is configured to receive the latch 30 when the armrest member 22 is in the first position 24. The locking mechanism 20 is configured to operably secure the latch 30 in the latch receiver 16 when the armrest member 22 is in the first position 24. In some configurations, the locking mechanism 20 may be an electronic locking mechanism that is in communication with the controller 38 such that the locking mechanism 20 may either secure or release the latch 30 in response to an output from the controller 38. It is generally contemplated that the locking mechanism 20 may be any of various forms of locking mechanisms 20, so long as the locking mechanism 20 may operably secure the latch 30. Additionally, or alternatively, in some embodiments, the latch receiver 16 may be coupled to the bottom portion 32 of the armrest member 22, and the latch 30 may be coupled to the top section 14 of the body 12, as provided herein.

Referring to FIGS. 2 and 3, the control panel 40 may be coupled to the body 12. For example, the control panel 40 may be disposed on the top section 14 of the body 12, as illustrated in FIGS. 2 and 3 The control panel 40 further comprises an adjustable feature 42. The adjustable feature 42 may be configured to receive/send an input from the controller 38 and may be configured to receive/send an output to the controller 38. The output sent to the controller 38 may be configured to actuate a function of the vehicle 50. By way of example not limitation, the output generated by the adjustable feature 42 to the controller 38 may be configured to actuate a steering function of the vehicle 50. It is generally contemplated that output generated by the adjustable feature 42 to the controller 38 may be configured to actuate various functions of the vehicle 50, such as a steering function, a sensor calibration, or other aspects relating to at least one system of the vehicle 50. In some configurations, a plurality of adjustable features 42 may be disposed on the control panel 40, as illustrated in FIG. 3. By way of example, not limitation, the control panel 40 may have a first adjustable feature 42, such as a rotary dial, that communicates with the controller 38 to actuate a steering function of the vehicle 50, and a second adjustable feature 42 that communicates with the controller 38 to initiate a sensor calibration. Additionally or alternatively, it is generally contemplated that the adjustable feature 42 may be a dial, a switch, a button, a touch feature, or various other selective features, so long as the adjustable feature 42 may receive an input from the controller 38 and generate an output to the controller 38.

Figure 10:
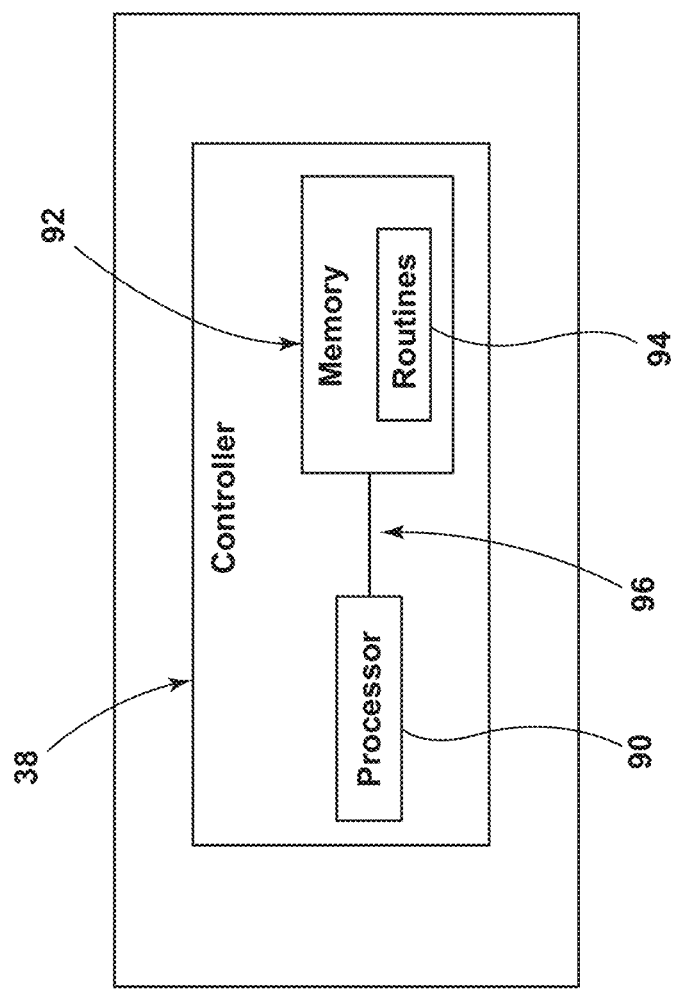
FIG. 10 is a schematic representation of a controller, according to one example.

Referring to FIG. 10, the armrest assembly 10 includes the controller 38. The controller 38 further comprises a processor 90, a memory 92, and other control circuitry. Instructions or routines 94 are stored within the memory 92 and are executable by the processor 90. The controller 38 may include at least one routine 94 that relates to actuating the locking mechanism 20 in response to an input provided to the controller 38. For example, the controller 38 may actuate the locking mechanism 20 to a lock position or an unlock position in response to an authentication key provided by the input device 36. Similarly, the controller 38 may include at least one routine 94 that relates to receiving an output from at least one adjustable feature 42 and actuating a function of the vehicle 50. For example, the adjustable feature 42 may be a rotary knob configured to control a steering function of the vehicle 50. Additionally, or alternatively, the controller 38 may include at least one routine 94 related to calibration of at least one sensor, wherein the routine 94 of the controller 38 may automatically calibrate at least one sensor and/or the routine 94 may manually calibrate at least one sensor in response to an input provided by a user.

According to various aspects, the controller 38 may store information via the memory 92. In some embodiments, the controller 38 may store information within the memory 92 that relates to user authorization. By way of example, not limitation, the controller 38 may store information relating to an authentication key, a reading from an RFID tag, a communication with a cell phone, or an identification of car keys or a key fob. Additionally, or alternatively, it is generally contemplated that the controller 38 may store several forms of data provided by various devices and means, so long as the data may be stored within the memory 92 of the controller 38.

The controller 38 may include communication circuitry 96 to allow the controller 38 to communicate with one or more adjustable features 42 and/or input devices 36. Additionally, or alternatively, the controller 38 may include communication circuitry 96 that allows the controller 38 to communicate with other various devices. For example, the controller 38 may include communication circuitry 96 that allows the controller 38 to communicate with a cell phone, an RFID tag, a key fob, or other various devices.

Figure 4:
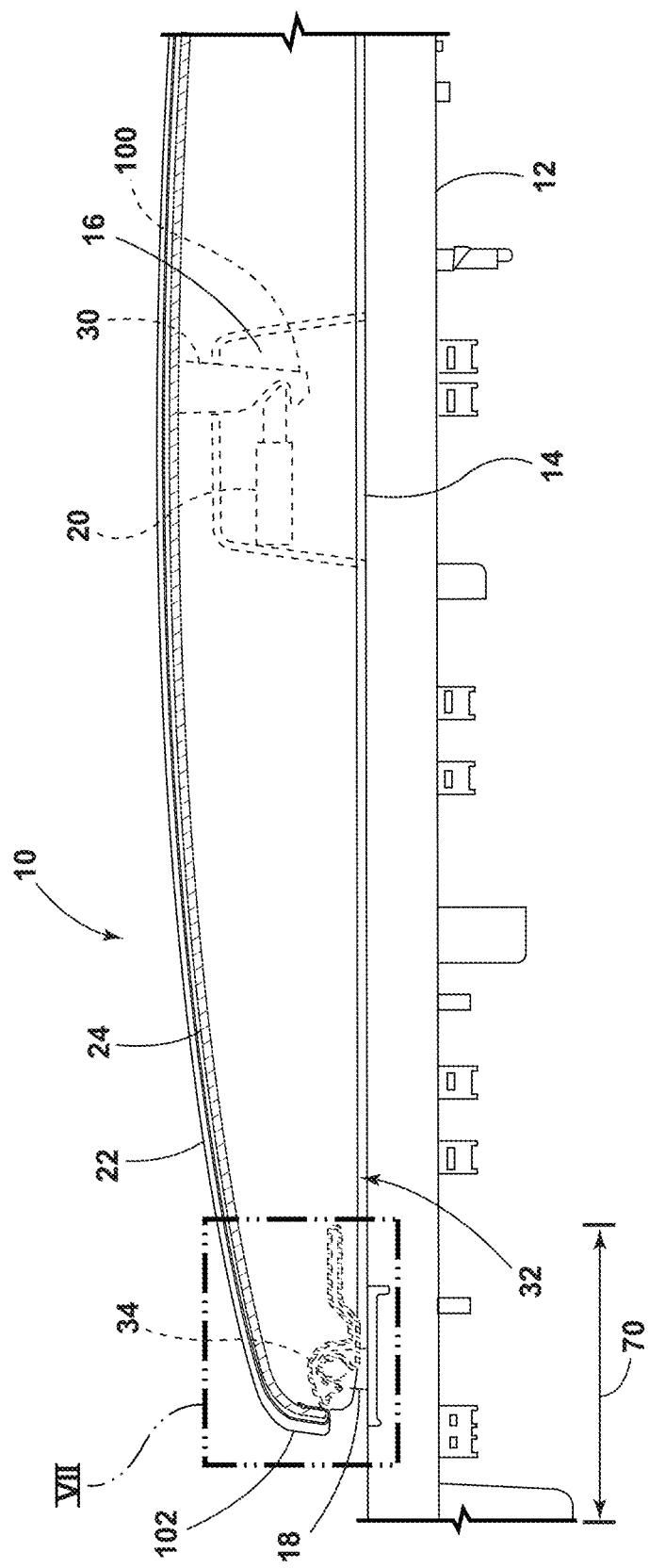
FIG. 4 is a side view of an armrest assembly with an armrest member in a first position.
Figure 5:
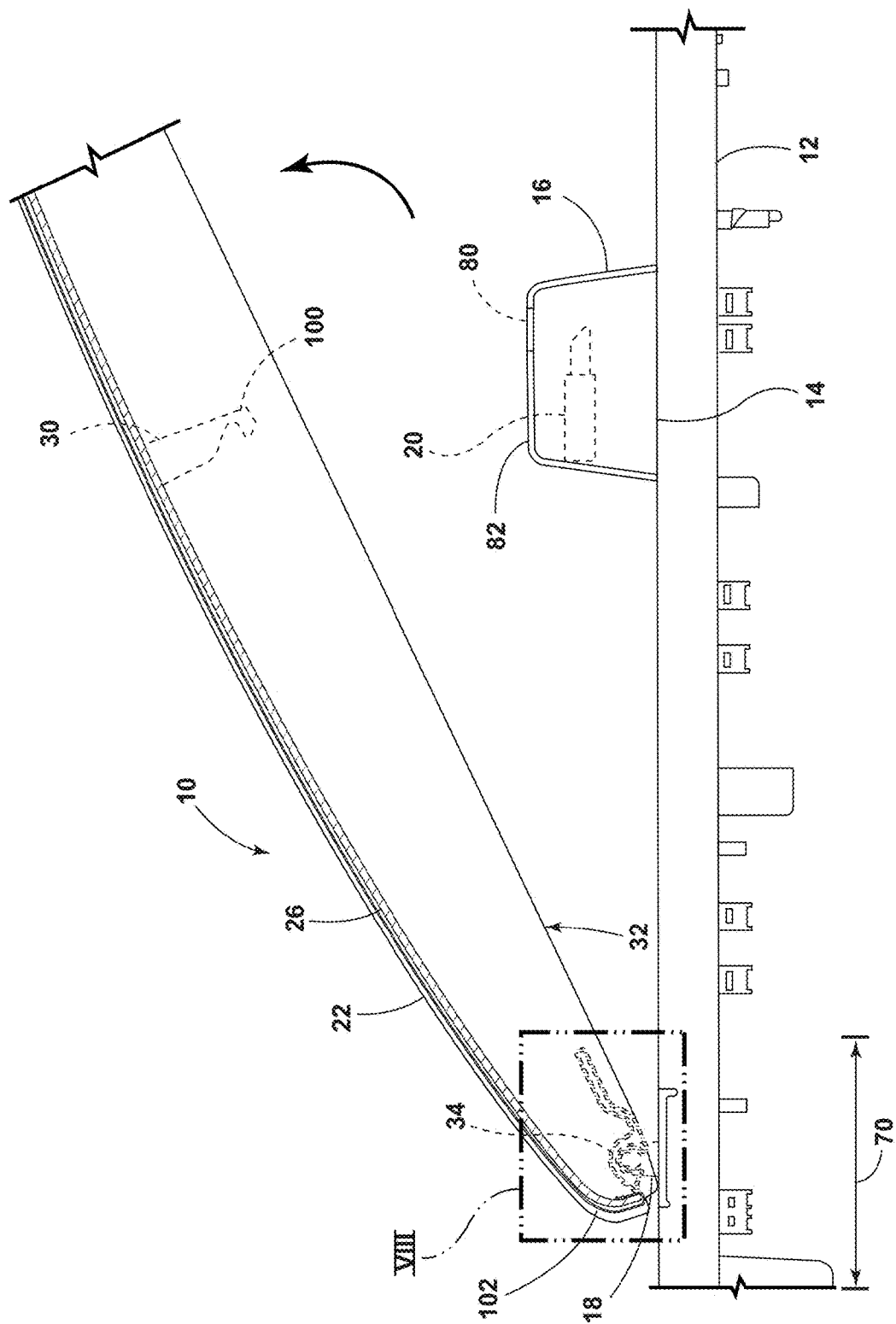
FIG. 5 is a side view of the armrest assembly with an armrest member in a second position.
Figure 6:
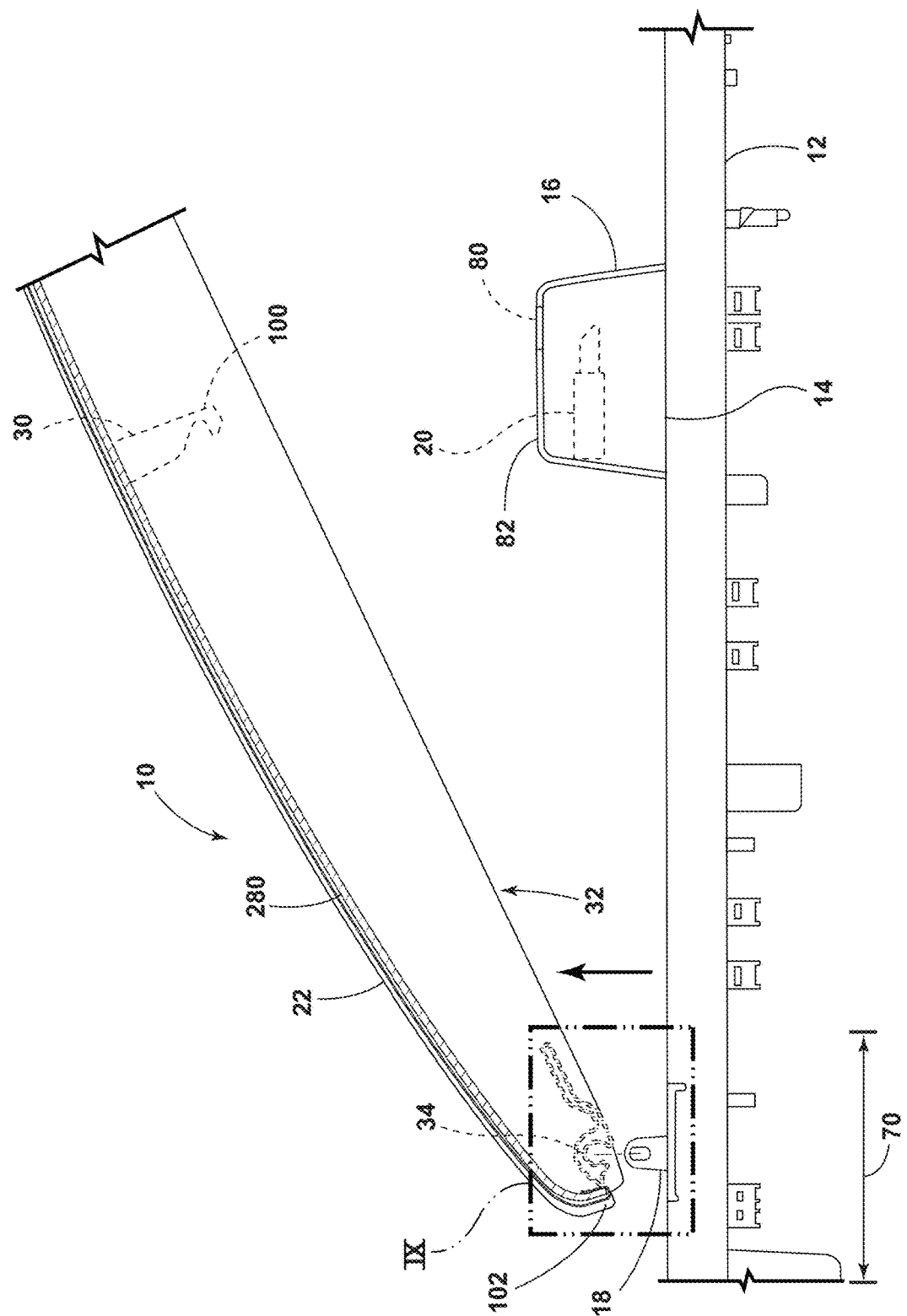
FIG. 6 is a side view of the armrest assembly with an armrest member in a third position.
Figure 7:
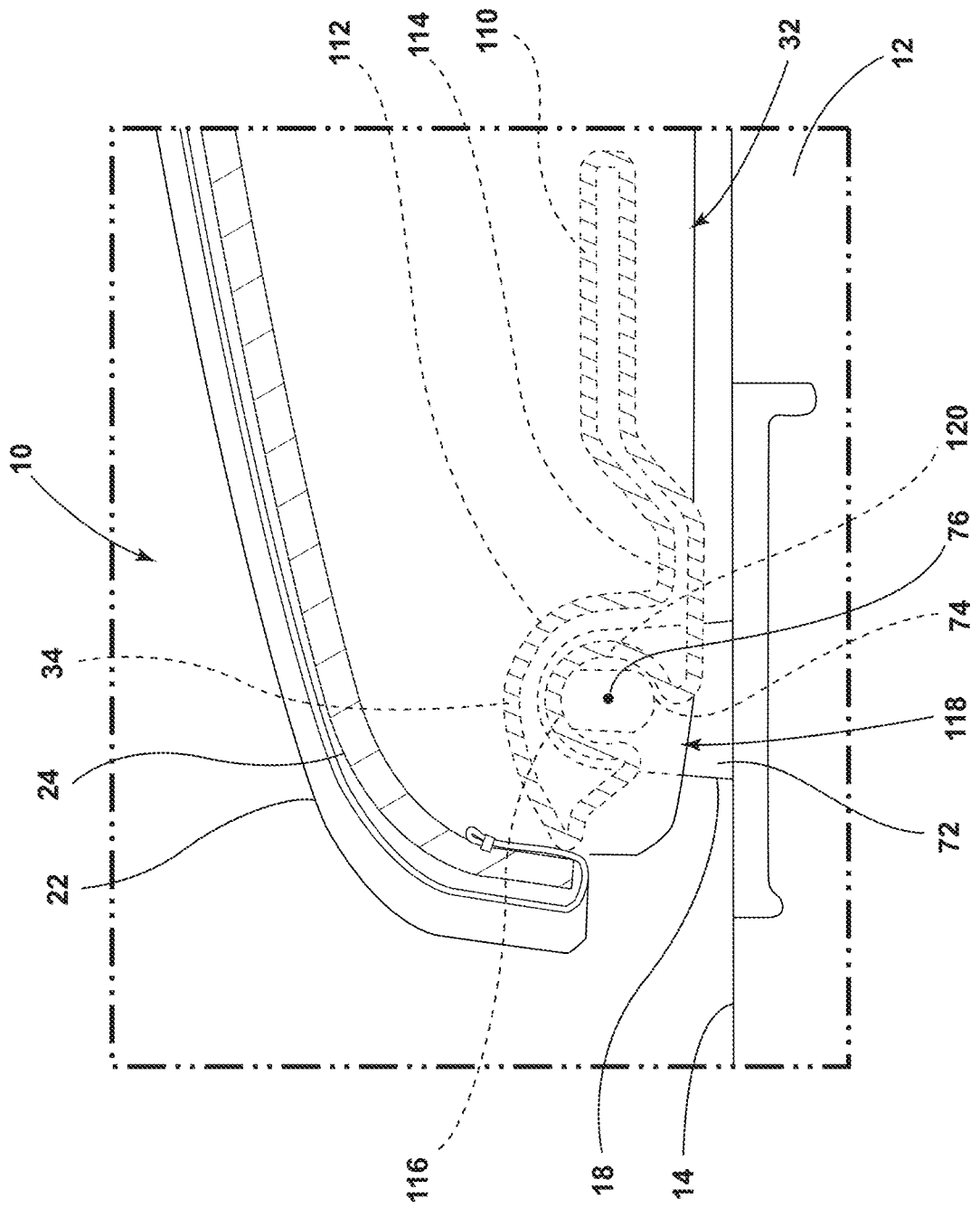
FIG. 7 is an enlarged partial-side view of an armrest assembly with an armrest member in a first position.
Figure 8:
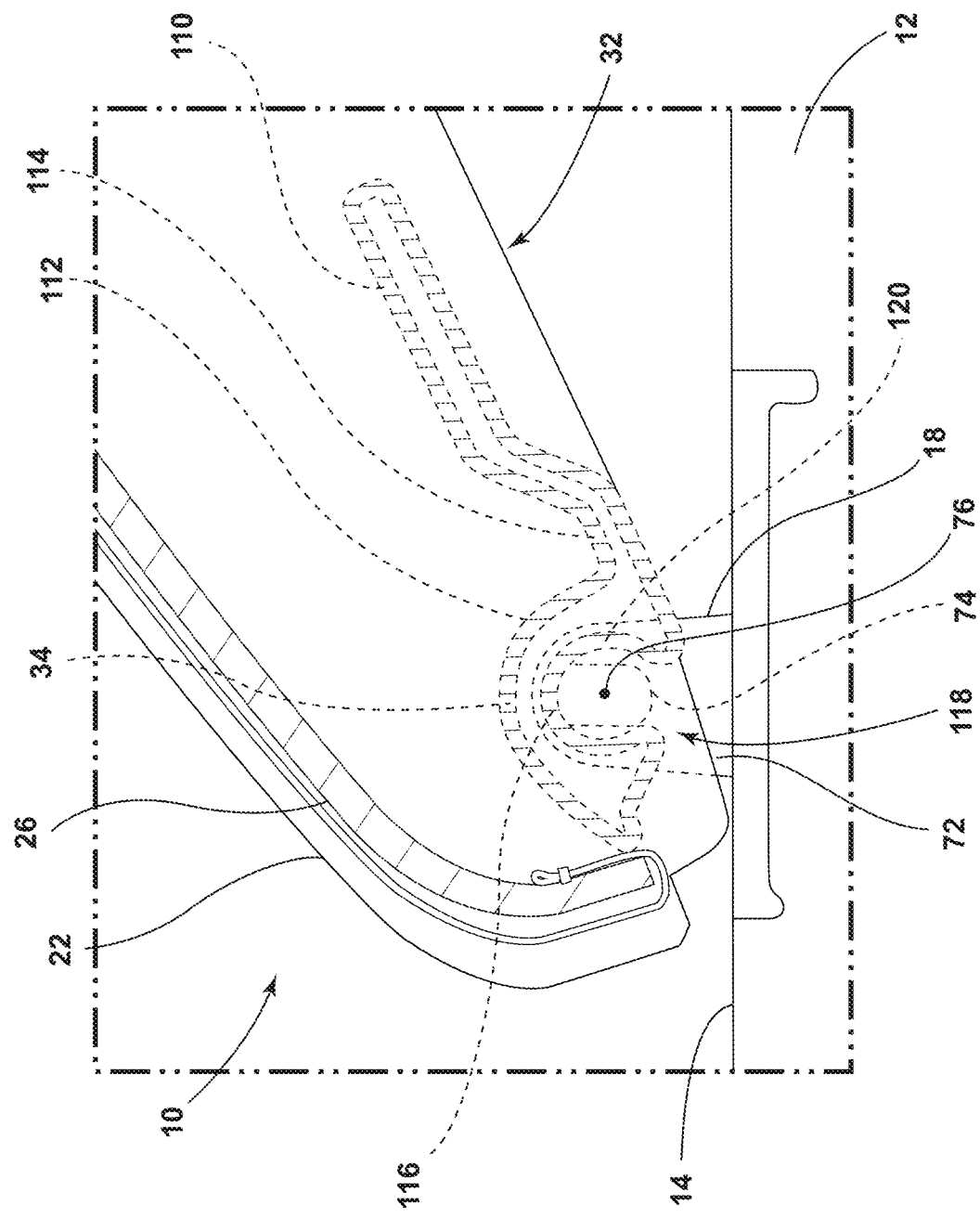
FIG. 8 is an enlarged partial-side view of an armrest assembly with an armrest member in a second position.
Figure 9:
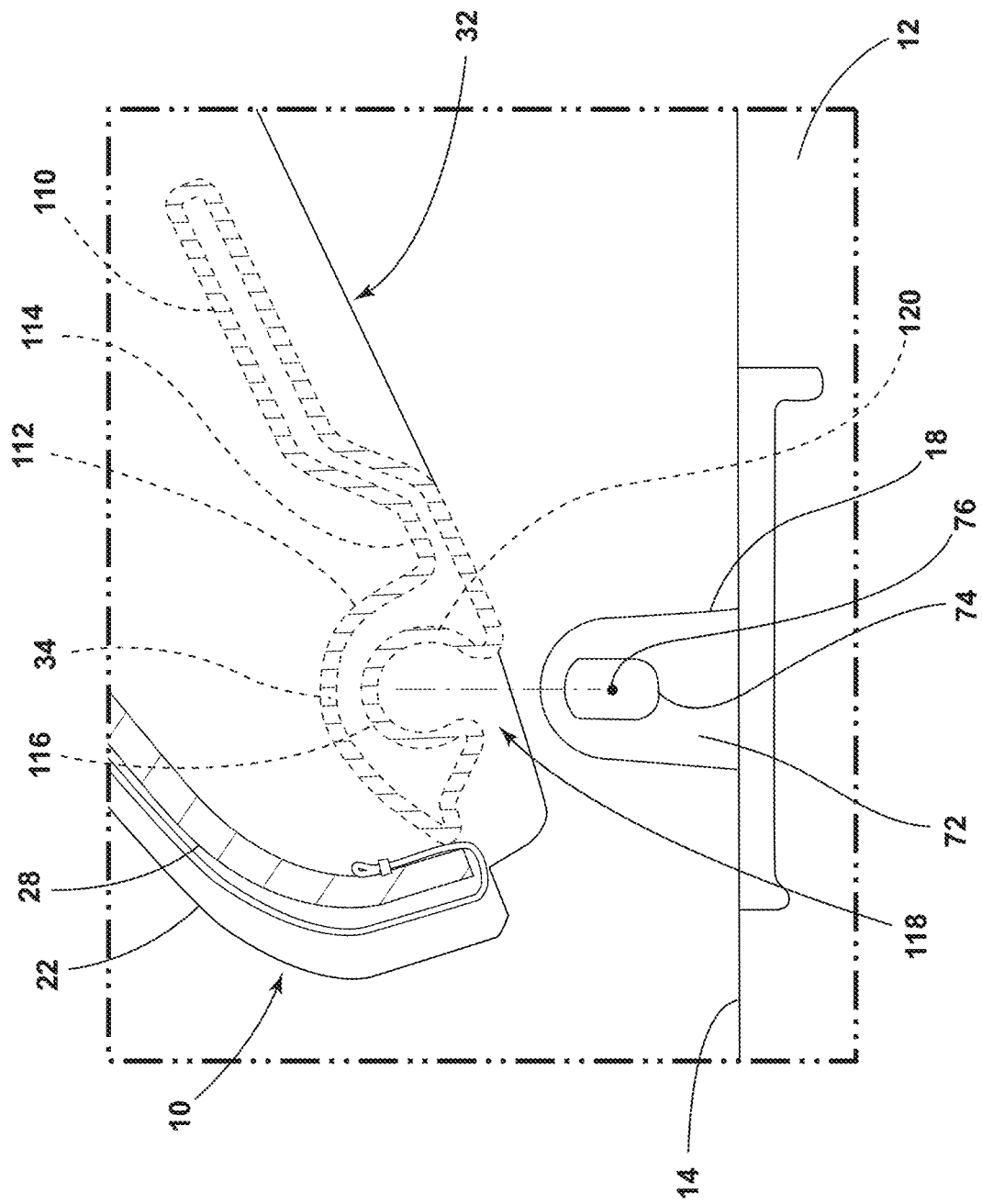
FIG. 9 is an enlarged partial-side view of an armrest assembly with an armrest member in a third position.

Referring to FIGS. 1-9, an armrest member 22 may be coupled to the body 12. In some configurations, the armrest member 22 may be pivotably coupled to the body 12. In other configurations, the armrest member 22 may be operably coupled to the body 12. For example, the armrest member 22 may be pivotable from a first position 24 to a second position 26, and the armrest member 22 may be translated from the second position 26 to a third position 28, wherein the armrest member 22 is decoupled from the body 12 in the third position 28, as illustrated in FIGS. 4-6. The armrest member 22 is configured to operably cover the top section 14 of the body 12. For example, the armrest member 22 may be configured to operably cover the control panel 40 disposed on the top section 14 of the body 12, such that the control panel 40 is covered when the armrest member 22 is in the first position 24, the control panel 40 is partially covered when the armrest member 22 is in the second position 26, and the control panel 40 is uncovered when the armrest member 22 is in the third position 28. In some configurations, the armrest member 22 may be configured to regulate access to the control panel 40. For example, the armrest member 22 may prevent access to the control panel 40 when the armrest member 22 is in the first position 24.

Referring to FIGS. 4-6, a latch 30 may be coupled to the armrest member 22. In various embodiments, the latch 30 may be coupled to a bottom portion 32 of the armrest member 22 and extend generally outward from the bottom portion 32 of the armrest member 22, as illustrated in FIGS. 4-6. The latch 30 may further comprise a latch engagement member 100 defined on an end of the latch 30. In some embodiments, the latch engagement member 100 is configured to be received in the latch receiver 16, via the latch receiver aperture 80, and operably couple with the locking mechanism 20. In other embodiments, the latch engagement member 100 is configured to limit movement of the armrest member 22 when the latch engagement member 100 is coupled to the locking mechanism 20. For example, the latch engagement member 100 may couple with the locking mechanism 20 when the armrest is in the first position 24. When coupled to the locking mechanism 20, the latch engagement member 100 limits rotation of the armrest member 22 from the first position 24 to the second position 26. Additionally, or alternatively, it is generally contemplated that the armrest assembly 10 may include a plurality of latches 30 and a plurality of latch receivers 16. It is also contemplated that in some embodiments, the latch 30 may be coupled to the top section 14 of the body 12, and the latch receiver 16 may be coupled to the bottom portion 32 of the armrest member 22, such that the latch receiver 16 travels towards the latch 30 as the armrest member 22 rotates from the second position 26 to the first position 24.

Referring to FIGS. 4-9, the armrest assembly 10 includes a hinge feature 34 coupled to the armrest member 22. In some embodiments, the hinge feature 34 may be coupled to the bottom portion 32 of the armrest member 22, as illustrated in FIGS. 4-9. In other embodiments, the hinge feature 34 may be coupled to a vehicle-forward portion 102 of the armrest member 22. The hinge feature 34 may further comprise a proximal section 110 and a distal section 112 that intersect at a hinge feature corner 114. The proximal section 110 may be coupled to the armrest member 22 and may be generally coplanar with the bottom portion 32 of the armrest member 22, as illustrated in FIGS. 7-9. The distal section 112 of the hinge feature 34 may generally define a semicircular shape, as illustrated in FIGS. 7-9. For example, the distal section 112 of the hinge feature 34 may have an arc length defined by an arc angle that is generally greater than 180 degrees, such that the distal section 112 of the hinge feature 34 generally defines an omega symbol shape (ex., Ω). In some embodiments, the distal section 112 may be configured to operably couple to the receiver head 74. For example, the distal section 112 may be operably coupled to the armrest member 22 when the armrest member 22 is translated downward from the third position 28 to the second position 26, and when the armrest member 22 is rotated from the first position 24 to the second position 26. The distal section 112 may then be configured to operably decouple from the receiver head 74, such as when the armrest member 22 is translated from the second position 26 to the third position 28. In yet other embodiments, the distal section 112 is configured to limit translation of the armrest member 22. For example, the distal section 112 may be configured to limit at least a radial, axial, and tangential movement of the armrest member 22 when the armrest member 22 is in the first position 24, and the distal section 112 may limit an axial and tangential translation of the armrest member 22 in the second position 26. It is also contemplated that the armrest assembly 10 may include a plurality of hinge features 34. For example, the armrest assembly 10 may include a first hinge feature 34 and a second hinge feature 34. The first hinge feature 34 and the second hinge feature 34 may operably couple to at least one receiver head 74, wherein the first hinge feature 34 and the second hinge feature 34 allow for rotation of the armrest 22 from the first position 24 to the second position 26 about the at least one receiver head 74.

Referring further to FIGS. 7-9, the distal section 112 may further comprise a distal section interior wall 116 that further defines a hinge slot 118 and an aperture 120 having a generally semi-spherical shape that is vehicle upward of the hinge slot 118. In some configurations, the hinge slot 118 is generally adjacent to the receiver head 74 when the armrest is in the first position 24, and the hinge slot 118 is generally vehicle downward of the receiver head 74 when the armrest member 22 is in the second position 26, as illustrated in FIGS. 7 and 8. The hinge slot 118 is configured to allow translation of the receiver head 74 into the aperture 120 and out of the aperture 120 when the armrest member 22 is translated between the second position 26 and third position 28. The aperture 120 is configured to receive the receiver head 74, and allow a rotational movement about the center axis 76 of the receiver head 74. In some embodiments, the aperture 120 allows the receiver head 74 to maintain operable contact with the distal section interior wall 116 as the armrest member 22 is rotated about the receiver head 74. It is generally contemplated that the distal section 112 may defined various structures and shapes, so long as the distal section 112 may allow for translation of the receiver head 74 into the aperture 120 and out of the aperture 120, and allow for a rotational movement of the armrest member 22 about the receiver head 74 when the receiver head 74 is operably coupled to the hinge feature 34.

Referring to FIGS. 1-3, the armrest assembly 10 includes the input device 36. In some configurations the input device 36 may be disposed within the passenger compartment 54. For example, the input device 36 may be disposed on the top section of the body 12. In some embodiments, the input device 36 may be a human machine interface (HMI), a touch screen, an infotainment system, a cell phone, car keys, and/or an radio frequency identification tag (RFID tag). The input device 36 is configured to recognize an input provided by a user, and subsequently send an output to the controller 38. For example, the input device 36 may be a touch screen and the input may be an authorization key provided by a user. The input device 36 may then output the provided authorization key to the controller 38, which may then cause actuation of a component of the armrest assembly 10, as provided further herein. In some configurations, a plurality of input devices 36 may be disposed on the control panel 40, as illustrated in FIG. 3. Additionally, or alternatively, the input device 36 may be various systems, so long as the input device 36 may be capable of receiving an input and providing an output. It is also contemplated that the armrest assembly 10 may include a plurality of input devices 36.

In operation of an exemplary embodiment of the armrest assembly 10, the armrest assembly 10 may be in a non-use condition. In the non-use condition, the armrest member 22 will be in the first position 24, such that the armrest member 22 at least partially covers the top section 14 of the body 12. Further, in the non-use position, the latch 30 is received within the latch receiver aperture 80 and secured by the locking mechanism 20. Further still, in the non-use position, the distal section 112 of the hinge feature 34 is coupled to the receiver head 74 of the hinge receiver 18 such that the distal section interior wall 116 is operably coupled to the receiver head 74 and the hinge slot 118 is adjacent the receiver head 74. The non-use position of the armrest assembly 10 can be illustrated in FIG. 1.

A user desiring to access the control panel 40 may actuate an input device 36, such as an HMI, and provide an authorization key to the controller 38. After the user actuates the input device 36 and provides an authorization key, an output is sent to the controller 38 if the authorization key is correct. The controller 38 will then initiate a routine 94 that actuates the locking mechanism 20, which then unsecures the latch engagement member 100 from the locking mechanism 20. The user may then grab the armrest member 22 and rotate the armrest member 22 about the receiver head 74 from the first position 24 to the second position 26. As the armrest member 22 rotates from the first position 24 to the second position 26, the latch 30 travels out of the latch receiver 16, via the latch receiver aperture 80. Further, as the armrest member 22 rotates from the first position 24 to the second position 26, the hinge slot 118 is repositioned from being adjacent the receiver head 74 to being generally vehicle downward of the receiver head 74.

Then, the user may grab the armrest member 22 and translate the armrest member 22 generally vehicle upward from the second position 26 to the third position 28. As the armrest member 22 translates from the second position 26 to the third position 28, the hinge feature 34 decouples from the receiver head 74 as the receiver head 74 translates out of the aperture 120 and through the hinge slot 118. Further, as the armrest member 22 translates from the second position 26 to the third position 28, the armrest assembly 10 transitions from the non-use condition to a use condition.

Once the armrest assembly 10 is in the use condition, a user may interact with at least one adjustable feature 42 on the control panel 40, wherein the adjustable feature 42 is configured to communicate with the controller 38 and subsequently actuate a function of the vehicle 50. For example, the user, wishing to manually steer the vehicle 50, may actuate a rotary knob 42 on the control panel 40 that is configured to actuate a steering function of the vehicle 50.

The user, desiring to return the armrest assembly 10 to the non-use condition, may grab the armrest member 22 and position the armrest member 22 in the third position 28, wherein the armrest member 22 is vehicle upward of the control panel 40. Next, the user may translate the armrest member 22 from the third position 28 to the second position 26. As the user translates the armrest member 22 from the third position 28 to the second position 26, the hinge feature 34 translate vehicle downward towards the receiver head 74 of the hinge receiver 18. Further, as the hinge feature 34 translates vehicle downward, the receiver head 74 will translate through the hinge slot 118, into the aperture 120, and will operably couple to the distal section interior wall 116.

Next, the user may grab the armrest member 22 and rotate the armrest member 22 about the receiver head 74 from the second position 26 to the first position 24. As the armrest member 22 rotates from the second position 26 to the first position 24, the hinge slot 118 of the hinge feature 34 is repositioned from being generally vehicle downward of the receiver head 74 to being adjacent the receiver head 74 and preventing a lateral translation of the armrest member 22. Further, as the armrest member 22 rotates from the second position 26 to the first position 24, the latch 30 travels towards the latch receiver 16 and into the latch receiver aperture 80 defined on the latch receiver 16. Once the latch 30 travels into the latch receiver 16, the latch engagement member 100 is proximate the locking mechanism 20.

Then, the user may secure the armrest member 22 to the body 12 and cover the control panel 40, by actuating the locking mechanism 20. The user may actuate the locking mechanism 20 by interacting with the input device 36 that is in communication with the controller 38. For example, the user may interact with an HMI 36 of the vehicle 50 and provide an authorization key that the controller 38 may recognize. Upon recognition of the authorization key, the controller 38 may initiate a routine 94 that actuates the locking mechanism 20, which then secures the latch engagement member 100 to the locking mechanism 20.

Use of the presently disclosed device may provide for a variety of advantages. First, the use of an input device 36 and locking mechanism 20 that operably couples the armrest member 22 to the body 12 allows for authorized access to the control panel 40. For example, in one embodiment, the control panel 40 is accessible to a user who provides the proper authorization key to the input device 36. Second, the placement of the control panel 40 next to a user who is driving the vehicle 50 or a passenger in the vehicle 50 provides increased efficiency in operating at least one adjustable feature 42. For example, a user, operating a rotary dial 42 configured to actuate a steering function of the vehicle 50, would be able to effectively operate the rotary dial 42 from the passenger compartment 54 and would be able to effectively view a roadway while actuating the steering function of the vehicle 50 via the rotary dial 42. Third, the use of the hinge feature 34 in transitioning between the first position 24, second position 26, and third position 28, allows for effective regulation in armrest member 22 movement, while also reducing the number of components needed to regulate the armrest member 22 movement, which may improve manufacturing efficiencies of the vehicle 50. Fourth, the placement of the control panel 40 underneath the armrest member 22 and coupled to the body 12 reduces the footprint in the passenger compartment 54, as compared to a vehicle 50 where the control panel 40, body 12, and armrest member 22 are distal from one another in the passenger compartment 54, and a separate means of securing the control panel 40 and adjustable features 42 are provided.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described able are merely for illustrative purposes and not intended to limit the scope of the disclosure, which is defined by the following claims, as interpreted according to the principles of patent law, including the doctrine of equivalents.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of operating a vehicle armrest, comprising:
positioning an armrest member on a body;
actuating an input device configured to communicate with a controller;
unlocking a locking mechanism disposed within a latch receiver coupled to the body;
decoupling a latch coupled to the armrest member from the latch receiver;
rotating the armrest member about a hinge receiver defined on the body from a first position to a second position;
translating the armrest member generally upward from the second position to a third position, wherein a hinge feature that is defined on the armrest is decoupled from the hinge receiver in the third position;
translating the armrest member generally downward from the third position to the second position, wherein the hinge feature is coupled to the hinge receiver in the second position;
rotating the armrest member about the hinge receiver from the second position to the first position;
coupling the latch to the latch receiver; and
locking the locking mechanism disposed within the latch receiver.

2. The method of claim 1 further comprising actuating an at least one adjustable feature that is disposed on a control panel, the control panel being disposed on a top portion of the body.

3. The method of claim 1, wherein the input device is a vehicle human machine interface.

4. The method of claim 3 further comprising inputting an authentication key into the vehicle human machine interface.

5. The method of claim 1, wherein the hinge receiver is coupled to a vehicle forward section of the body, and wherein the hinge feature is defined on a vehicle forward portion of the armrest member.

6. The method of claim 1 further comprising rotating the armrest member about a second hinge receiver from the first position to the second position.

7. The method of claim 1, wherein the latch is coupled to a bottom portion of the armrest member.

8. The method of claim 2, wherein the at least one adjustable feature is configured to direct at least one steering function of a vehicle.

9. A method of operating a vehicle armrest, comprising:
positioning an armrest member on a top section of a body;
actuating an input device configured to communicate with a controller, wherein the controller is configured to communicate with a locking mechanism;
inputting an authorization key into the input device;
unlocking the locking mechanism disposed within a latch receiver coupled to the body;
decoupling a latch coupled to the armrest member from the latch receiver;
rotating the armrest member about a first hinge receiver and a second hinge receiver defined on the body from a first position to a second position;
translating the armrest member generally upward from the second position to a third position, wherein a first hinge feature and a second hinge feature are decoupled from the first hinge receiver and the second hinge receiver in the third position;
actuating at least one adjustable feature disposed on a control panel that is disposed on a top portion of the body;
translating the armrest member generally downward from the third position to the second position, wherein the first hinge feature is coupled to the first hinge receiver and the second hinge feature is coupled to the second hinge receiver in the second position;
rotating the armrest member about the first hinge receiver and the second hinge receiver from the second position to the first position;
coupling the latch to the latch receiver; and
locking the locking mechanism disposed within the latch receiver.

10. The method of claim 9 further comprising actuating at least one adjustable feature disposed on a control panel, the control panel being disposed on the top section of the body.

11. The method of claim 9, wherein the first hinge receiver and the second hinge receiver are defined on a top section of the body, and wherein the first hinge receiver and the second hinge receiver are defined on a vehicle forward section of the body, and wherein the first hinge receiver is generally coaxial with the second hinge receiver.

12. The method of claim 9 further comprising disengaging a latch engagement member defined on an end of the latch with the locking mechanism.

13. The method of claim 12 further comprising engaging the latch engagement member with the locking mechanism.

14. An armrest assembly of a vehicle, comprising:
a body having a top section, wherein the body has a hinge receiver coupled to the top section;
an armrest rotationally coupled and removably coupled to the body, wherein the armrest member is rotatably movable between a first position and a second position, and wherein the armrest member is translatable between the second position and a third position;
a latch receiver defined on the top section or a bottom portion of the armrest member, the latch receiver further comprising a locking mechanism disposed within the latch receiver;
a latch defined on the other of the top section or the bottom portion, wherein the latch is housed within the latch receiver when the armrest member is in the first position;
a hinge feature defined on the bottom portion of the armrest member, wherein the hinge feature is coupled to the hinge receiver when the armrest member is in the first position and the second position, and wherein the hinge feature is decoupled from the hinge receiver when the armrest member is in the third position; and
an input device configured to communicate with a controller, the controller being configured to actuate the locking mechanism.

15. The armrest assembly of claim 14 further comprising a control panel coupled to the top section of the body, the control panel further comprising at least one adjustable feature disposed on the control panel, wherein the adjustable feature is in communication with the controller.

16. The armrest assembly of claim 14, wherein the hinge receiver further comprises a receiver base and a receiver head vehicle upward of the receiver base, and wherein the hinge feature further comprises a slot feature, the slot featuring being configured to allow the receiver head to translate into an aperture defined within the hinge feature as the armrest member translates from the third position to the second position.

17. The armrest assembly of claim 16, wherein the slot feature is adjacent to the receiver head when the armrest member is in the first position, and wherein the slot feature is vehicle downward of the receiver head when the armrest member is in the second position.

18. The armrest assembly of claim 16, wherein the hinge receiver is coupled to a vehicle forward section of the body and the hinge feature is defined on a vehicle forward portion of the armrest member.

19. The armrest assembly of claim 15, wherein the at least one adjustable feature is configured to actuate at least one vehicle function.

20. The armrest assembly of claim 19, wherein the at least one vehicle function is a steering function of the vehicle.

\* \* \* \* \*